United States Patent [19]

Braam et al.

[11] Patent Number: 5,663,486

[45] Date of Patent: Sep. 2, 1997

[54] MECHANICAL LINEAR GUIDE

[75] Inventors: Bernardus Carolus Braam, Delft; Jan Hopman, Lelystad; Marinus Pieter Koster, Eindhoven, all of Netherlands

[73] Assignee: Nederlandse Organisatie Voor Toegepast-Natuurwetenschappelijk Onderzoek Tno, Delft, Netherlands

[21] Appl. No.: 454,358

[22] PCT Filed: Dec. 14, 1993

[86] PCT No.: PCT/NL93/00265

§ 371 Date: Aug. 7, 1995

§ 102(e) Date: Aug. 7, 1995

[87] PCT Pub. No.: WO94/13976

PCT Pub. Date: Jun. 23, 1994

[30] Foreign Application Priority Data

Dec. 16, 1992 [NL] Netherlands ................ 9202177

[51] Int. Cl.⁶ ........................................... G01N 37/00
[52] U.S. Cl. ..................... 73/1.38; 267/160; 248/605; 248/602; 73/1.82
[58] Field of Search ........................ 73/1 D, 1 DV; 267/158, 159, 160; 248/605, 581, 584, 585, 586, 602, 589, 610

[56] References Cited

U.S. PATENT DOCUMENTS

| 3,727,900 | 4/1973 | Casey . | |
|---|---|---|---|
| 4,691,586 | 9/1987 | van Leijenhorst et al. . | |
| 4,763,885 | 8/1988 | Zamitter | 267/160 |
| 4,768,702 | 9/1988 | Takahashi et al. . | |
| 5,139,242 | 8/1992 | Yarr . | |
| 5,315,890 | 5/1994 | Long | 267/160 |

FOREIGN PATENT DOCUMENTS 1 903 237  10/1969  Germany .

OTHER PUBLICATIONS

H. Bulten, "mechanismen voor parallel–geleiding", de contructeur, Nov. 1969, No. 11, pp. 45–52.

*Primary Examiner*—Michael Brock
*Assistant Examiner*—Nashmiya Ashraf
*Attorney, Agent, or Firm*—Young & Thompson

[57] ABSTRACT

A mechanical linear guide for making a body move in an axial direction, comprising a system which is preferably made up of reinforced leaf springs and/or hole-type hinges, and which is rotationally symmetrical about an axial direction and mirror-symmetrical about a plane perpendicular to the axial direction. The system is connected to a fixed base at six points (A, D, I, L, M, P), and a body (18) is suspended between two points (F, G) in such a way that it can carry out only movement in the axial direction, and not in the lateral direction.

8 Claims, 7 Drawing Sheets

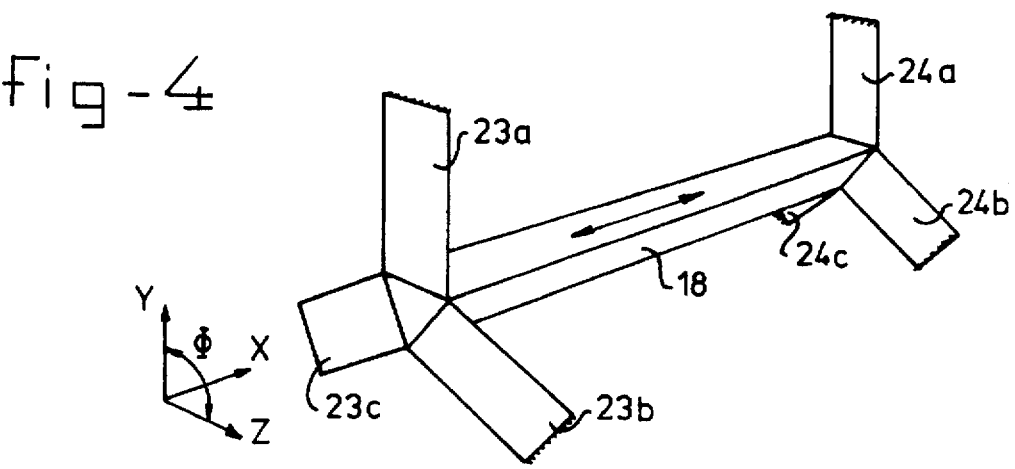
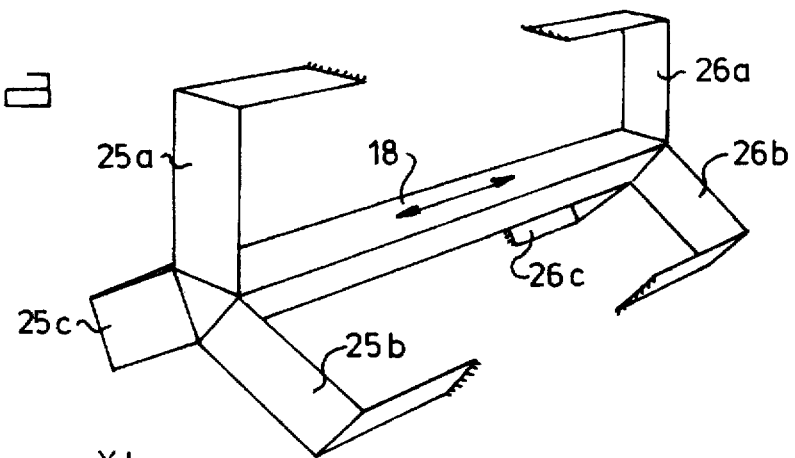
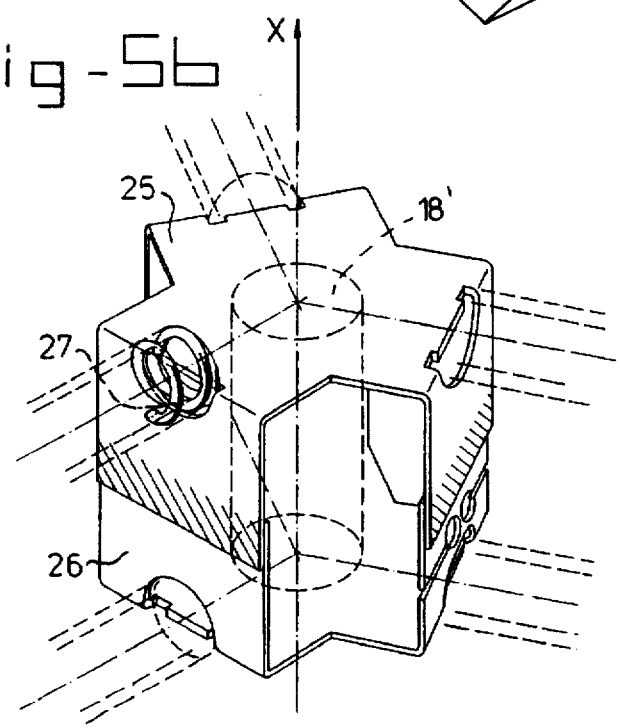

MECHANICAL LINEAR GUIDE

FIELD OF THE INVENTION

The invention relates to a mechanical linear guide for making a body move in an axial direction, comprising suspension means arranged between points arranged within n planes, n being an integer and at least equal to 2, all of said planes having a common curve of intersection along which an axial movement of said body is defined and adjacent planes meeting each other at an angle of $2\pi/n$ radians, each of said planes comprising a least a fixed first, a movable second and a common third point of said points, said common third point being situated at said common curve of intersection, within each of said planes first suspension means being connected at one end to said fixed first point and being movably connected by the other end at a predetermined angle at said movable second point to second suspension means, each of said second suspension means being movably connected to said body at said common third point.

BACKGROUND OF THE INVENTION

Such a construction forms part of a mechanical linear guide which is known from the lecture synopsis of M. P. Xoster, "Constructieprincipes voor het nauwkeurig bewegen en positioneren" ("Construction principles for accurately moving and positioning"), WA-163, University of Twente, October 1990, p. 172. In order to make only an axial movement possible in the known construction, the above-mentioned four suspension means and five points cannot lie in a flat plane. In the known construction the first three points lie in a first plane, and the third, fourth and fifth points lie in a second plane, which planes form an angle of 120° with each other. Further suspension means are also provided, in such a way that a three-dimensional, symmetrical construction is produced and movement possibilities other than in the axial direction are eliminated. The known construction makes it possible for the body to move substantially only in an axial direction and for the lateral movement possibilities to be very small. However, for certain applications, the lateral deflections occurring herewith are still too great.

OBJECT OF THE INVENTION

An object of the present invention is therefore to provide a mechanical linear guide which further reduces the lateral deflection possibilities of a body, while retaining a certain desired minimum axial deflection possibility.

SUMMARY OF THE INVENTION

For this purpose, a mechanical linear guide according to the invention is characterized in that within each plane third suspension means are provided, which are each connected at one end to said first fixed point and movably connected by the other end at a common fourth point to one end of fourth suspension means, which fourth suspension means are at the other end movably connected at said second point to said first and said second suspension means, all of said third suspension means and all of said fourth suspension means being movably interconnected at said common fourth point, which like said common third point is also situated on said common curve of intersection.

With such a mechanical linear guide, an extremely accurate linear movement can be given to a body, while the lateral deflections are less than 10 nm in the case of an axial deflection of, for example, 3 mm.

The number of planes as defined above may e.g. be equal to n=2 or n=3.

In one embodiment of the mechanical linear guide, each plane comprises a fixed fifth point, a movable sixth point, a common seventh point and a common eighth point, both said common seventh point and said common eighth point being situated on said common curve of intersection, the body being fixed between said common third point and said common seventh point, and said fixed fifth point, said movable sixth point, said common seventh point and said common eighth point forming a quadrangle substantially coinciding with the mirror image of a quadrangle formed by said fixed first point, said movable second point, said common third point and said common fourth point relative to a plane perpendicular to said common curve of intersection when the body is in rest, fifth suspension means being arranged between said fixed fifth point and said movable sixth point, sixth suspension means being arranged between said movable sixth point and said common seventh point, seventh suspension means being arranged between said fixed fifth point and said common eighth point and eighth suspension means being arranged between said movable sixth point and said common eighth point within each plane.

In this embodiment, within each plane a ninth suspension means may be provided between the movable second point and the movable sixth point.

Preferably, all suspension means are formed from leaf springs. Rotational rigidity about the axial direction is achieved in this way.

In a further embodiment, springs are provided in order to exert a laterally directed force, so that the axial rigidity is reduced.

The mechanical linear guide is preferably made up of three substantially identical monolithic parts.

The mechanical linear guide according to the invention is preferably used in a calibration unit for a gravitational field measuring device, based on acceleration recorders, which calibration unit comprises three substantially identical calibration devices, the respective bodies of which vibrate substantially along the axes of an orthogonal coordinate system, and thus also determine a coordinate system of the acceleration recorders.

BRIEF DESCRIPTION OF THE DRAWINGS

The invention will be explained further below with reference to a number of drawings, in which:

FIG. 2b shows the same arrangement as FIG. 2a, but viewed from a plane perpendicular to the plane of FIG. 2a;

FIG. 4 shows a view of a basic concept for a mechanical linear guide system;

FIG. 5a shows a further embodiment of the basic concept shown in FIG. 4;

FIG. 5b shows a variant of the embodiment shown in FIG. 5a;

DETAILED DESCRIPTION OF THE PREFERRED EMBODIMENTS

Figure 1:
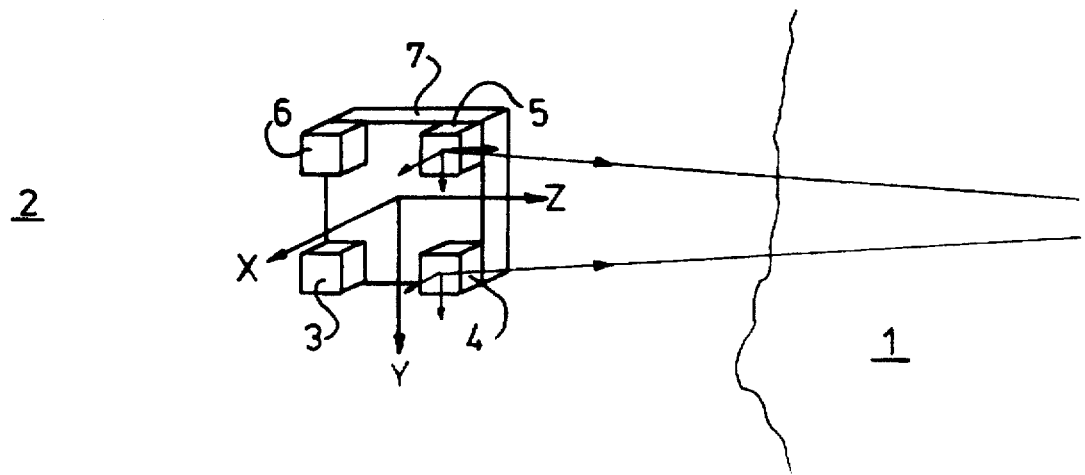
FIG. 1 shows diagrammatically a device in a satellite for measuring the gravitational field on earth.

The point of departure for the design of a mechanical linear guide was the need for having the most accurate calibration unit possible for gravitational field measuring device in satellites. FIG. 1 shows diagrammatically the measurement of the gravitational field on earth 1 from space 2 with the aid of four three-dimensional acceleration meters 3, 4, 5, 6 situated in a satellite (not shown). The four acceleration meters are placed on a rigid plate 7, so that they assume a fixed position relative to each other. The letters x, y and z in FIG. 1 indicated a coordinate system which is fixed in relation to the four acceleration meters 3, 4, 5, 6. The satellite moves around the earth in such a way that the z-axis is always directed substantially exactly towards the centre point of the earth.

Direct measurement of the gravitation in a free-flying satellite is not possible. It is possible to determine the gravitational gradient by means of the four acceleration meters 3, 4, 5, 6, and to determined the gravitational field from this. The gravitational field on earth must be determined with very great accuracy by means of the four acceleration meters 3, 4, 5, 6: the accuracy must be at least $5 \times 10^{-3}$ m/s$^2$ and the resolution 100 km×100 km at earth level. Such a high accuracy requires the acceleration meters 3, 4, 5, 6 to be calibrated constantly on board the satellite. For this purpose, a calibration unit of very high accuracy is necessary.

The calibration unit preferably consists of three calibration devices 9, 10, 11, which generate three orthogonally directed harmonic forces (FIG. 2). Each of these forces makes the satellite as a whole vibrate in each of the three respective directions, each with its own frequency. For the x-, y- and z-direction, it is possible to select, for example, a frequency of 4/12, 5/12, and 6/12 Hz respectively, while the acceleration amplitude is the same for all three directions and is, for example, $10^{-3}$ m/s$^2$. Through these vibrations, calibration measuring points in the x-, y- and z-direction are obtained in the acceleration meters 3, 4, 5, 6, the frequencies of which points correspond to the above-mentioned values of 4/12, 5/12 and 6/12 Hz respectively. These frequency values lie outside the frequency range of approximately 0.005–0.125 Hz, which is important for the determination of the gravitational field, so that by filtering calibration signals are obtained. The coordinate system defined by the calibration units 9, 10, 11 need not coincide with the coordinate system of the satellite.

Figure 2A:
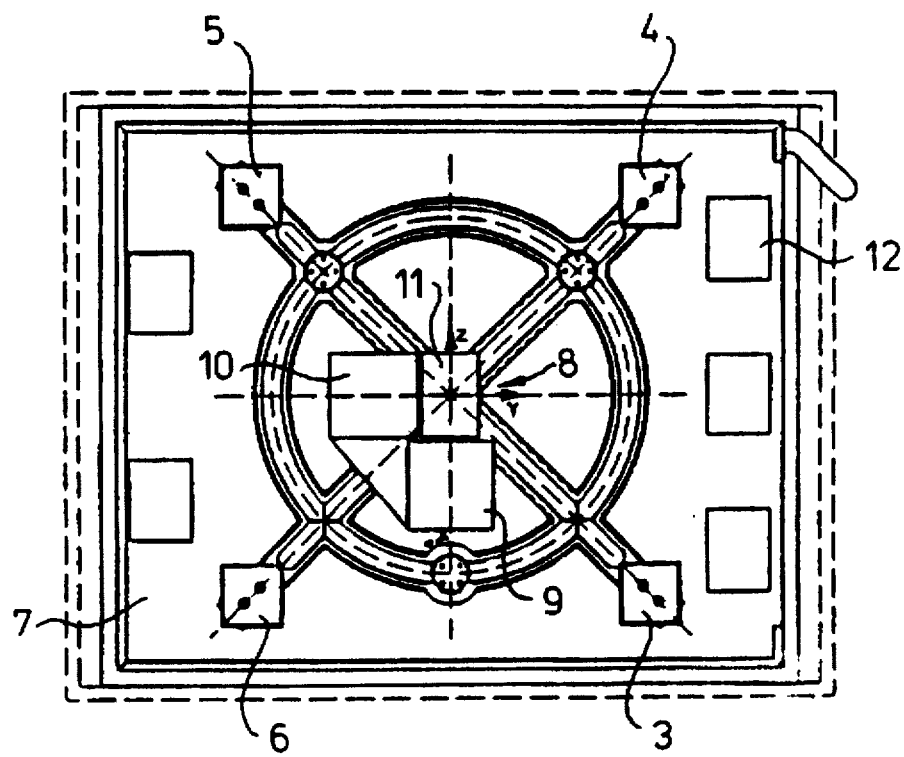
FIG. 2a shows an arrangement of a gravitational field measuring device in a satellite provided with calibration means.
Figure 2B:
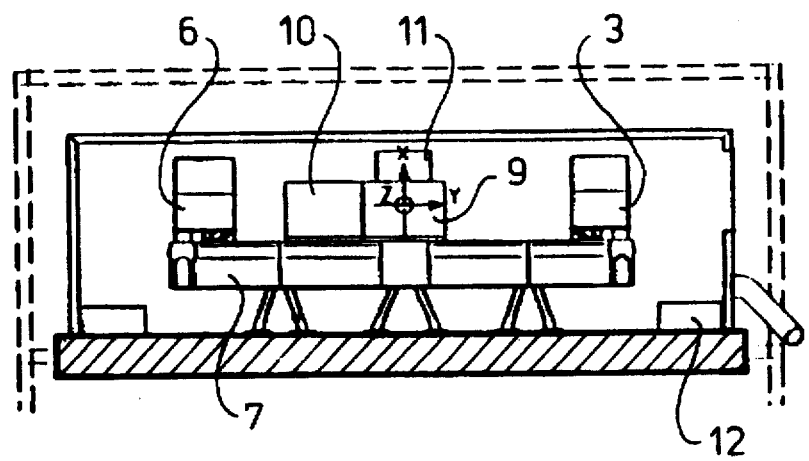

FIG. 2a shows the position of the calibration units 9, 10, 11 in the centre of the four acceleration meters 3, 4, 5, 6, viewed from the x-direction. FIG. 2b shows a view of the arrangement according to FIG. 2a, but viewed from the negative z-direction. This latter figure also shows a box 12, in which inter alia, the necessary electronics and electrical supply are housed.

Figure 3:
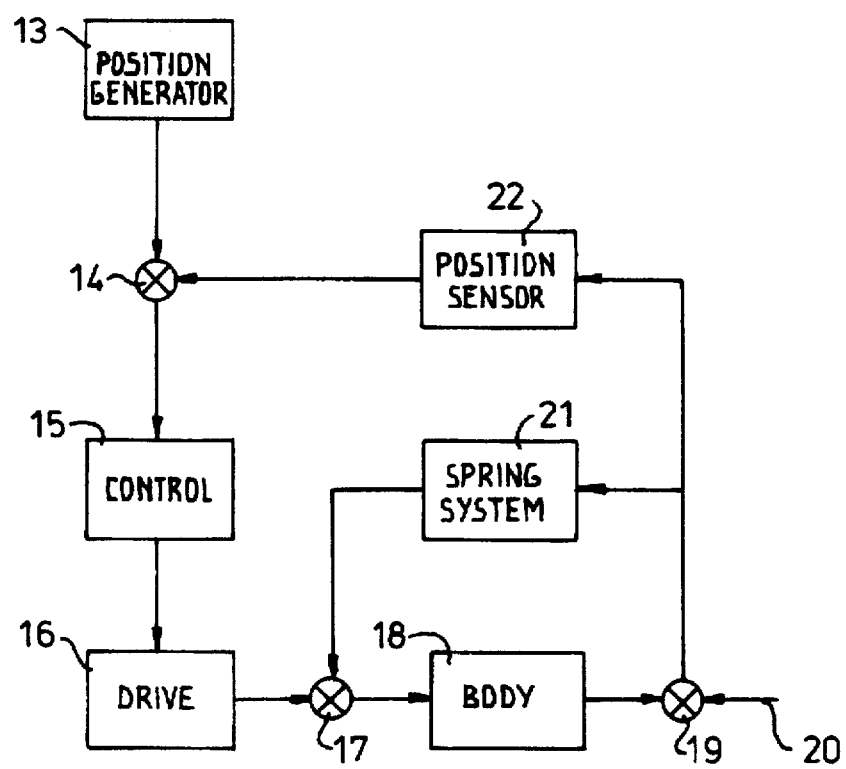
FIG. 3 shows a block diagram of a control circuit for the calibration means.

For this purpose, each calibration unit 9, 10, 11 contains a body which vibrates in the x-, the y- or the z-direction, and which is driven by an actuator in an electronic control loop, and the position of which is measured by a position sensor. FIG. 3 shows a block diagram of the control loop used. A control signal which is suitable for the desired sinusoidal movement of the body 18 is generated by a position generator 13 and fed to a summation unit 14. The summation unit 14 deducts from this control signal the output signal of a position sensor 22 which measures the actual position of the body 18. The summation unit 14 transmits a correction signal, based on the deduction, to control electronics 15, which in turn generate a drive signal for actuator drive electronics 16. The actuator drive electronics 16 generate, for example, an electromagnetic force in order to give the body 18 the desired sinusoidal movement. This electromagnetic force is counteracted by spring forces generated by a spring system 21 (to be discussed later), which is shown symbolically by means of the summation unit 17. External interferences with the movement of the body are indicated by 20, the influence of which interferences is shown symbolically by the summation unit 19. The control electronics can carry out any form of regulation known per se to the person skilled in the art, i.e. P-, PI- or PID regulation.

As already said, each of the three calibration units 9, 10, 11 must be provided with a body 18 which vibrates substantially only in one direction, and the deflection of which in any other direction is substantially 0. The design principles are explained further below for a body 18 vibrating in the x-direction. The same design principles apply to the bodies vibrating in the y- and z-direction. Table 1 below gives the required design specifications for the vibrating body in the x-direction.

TABLE 1

| parameter | Value |
| --- | --- |
| amplitude vibrating body | 3 mm |
| frequency vibrating body | 4/12 Hz |
| mass vibrating body | 0.76 kg |
| nominal movement (x-direction): | |
| force noise amplitude at | |
| –5/12 Hz | <19.2 nm |
| –6/12 Hz | <13.3 nm |
| –8/12 Hz | <15 nm |
| phase synchronization | <1 × 10$^{-3}$ rad |
| parasitic movement (lateral) | |
| force noise amplitude at | <19.2 nm |
| –5/12 Hz | <13.3 nm |
| –6/12 Hz | 1 second of arc |
| course accuracy | <15 nm |
| or 'decenter' over 3 mm | |

FIG. 4 shows a design which is known per se for achieving a linear movement of a body 18, given here in order to make the mechanical linear guide according to the invention easier to understand. The body 18 is set in motion in the x-direction by means of an actuator which is not shown. At the two ends the body 18 is suspended from three leaf springs 23a, 23b, 23c and 24a, 24b, 24c respectively. The three leaf springs 23a, 23b, 23c are preferably placed at respective angles of 120° relative to each other and their ends not connected to the body 18 are connected to a fixed base. The same applies to the three leaf springs 24a, 24b, 24c. Due to the suspension of the body 18 shown in FIG. 4 and the rigidity of the leaf springs in the lengthwise direction thereof, and the in-plane rigidity thereof, the body can move substantially only in the x-direction. However, the simple design shown in FIG. 4 has the disadvantage that only a very small axial movement in the x-direction is possible, because any movement in the x-direction requires expansion of the in-principle rigid leaf springs 23a, 23b, 23c, 24a, 24b, 24c. Besides, the system is many times over-determined, inter alia in a direction φ about the x-axis (see FIG. 4). For the most accurate possible undisturbed axial movement of the body 18, the system must be prevented from being over-determined in any direction, because that is precisely what leads to undesirable and uncontrollable tensions, and therefore movement deflections.

The system shown in FIG. 5a solves the first-mentioned problem of the system shown in FIG. 4. The system shown in FIG. 5a differs from that shown in FIG. 4 to the extent that the leaf springs 23a, 23b and 23c are replaced by leaf springs 25a, 25b and 25c respectively, which are folded through a predetermined angle, and the leaf springs 24a, 24b and 24c are replaced by leaf springs 26a, 26b and 26c respectively, which are folded through a predetermined angle. On account of the folds in the leaf springs 25a, 25b, 25c, 26a, 26b, 26c, those parts thereof which are connected to the body 18 can carry out an axial movement without the expansion forces in the leaf spring becoming too great, because near their folds the leaf springs can move in the lateral direction. At the same time, the system is rigid for the body 18 in the lateral direction, on account of the three-point suspension of the leaf springs and the in-plane rigidity thereof. The system shown in FIG. 5a is over-determined in the direction φ, which can lead to undesirable tensions. This could possibly be compensated for by giving the body 18 a relatively low torsional rigidity.

FIG. 5b shows a mechanical linear guide which is known per se, and which is based on the design principle of FIG. 5a. The three leaf springs 25a, 25b, 25c together form a leaf spring construction 25, and the three leaf springs 26a, 26b, 26c together form a leaf spring construction 26. The leaf spring construction 25 is pushed with the three flanged ends over the three respective flanged ends of the leaf spring construction 26, while the construction pushed together is connected to a fixed base at the three overlapping areas. At the total of six positions where each of the two leaf spring constructions 25, 26 is folded over, a spring is fitted, one 27 of which is shown in FIG. 5b. Each of these springs 27 exerts a pressure force on the leaf spring construction 25, 26 in a direction perpendicular to the x-axis. The reason for fitting these springs 27 will be explained later with reference to FIGS. 9 and 10. A body can be fitted within the system shown in FIG. 5b at the position of the cylinder 18' shown by dashed lines. The cylinder shape is shown here only by way of example, and is not essential for the present invention.

Although with the system shown in FIGS. 5a, 5b a higher axial deflection (i.e. in the x-direction) of the body 18 is possible than with the system shown in FIG. 4, this is at the expense of the lateral rigidity (i.e. in directions perpendicular to the x-direction) of the system, because the leaf springs 25 (a, b, c), 26 (a, b, c) are not bounded in the lateral direction, and thus for lateral rigidity use cannot be made of the longitudinal rigidity of the leaf springs.

Figure 6C:
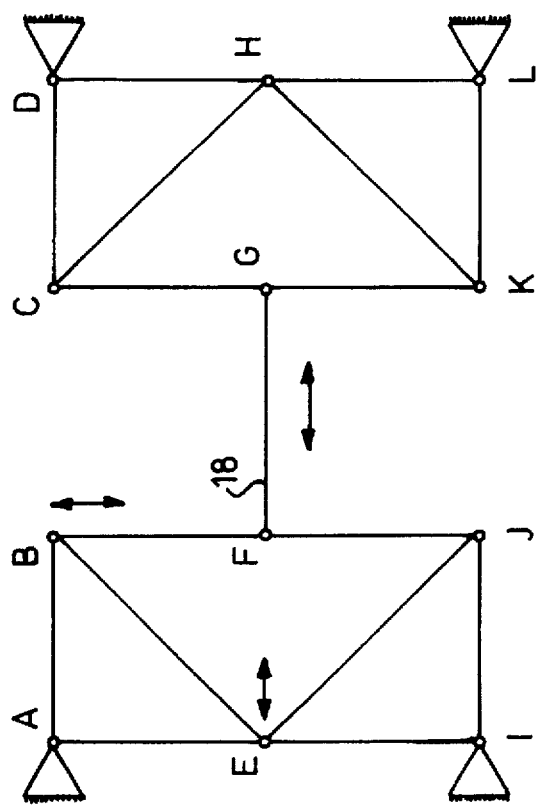
FIGS. 6a, 6b and 6c show the design principles for a mechanical linear guide system.
Figures 6A, 6B:
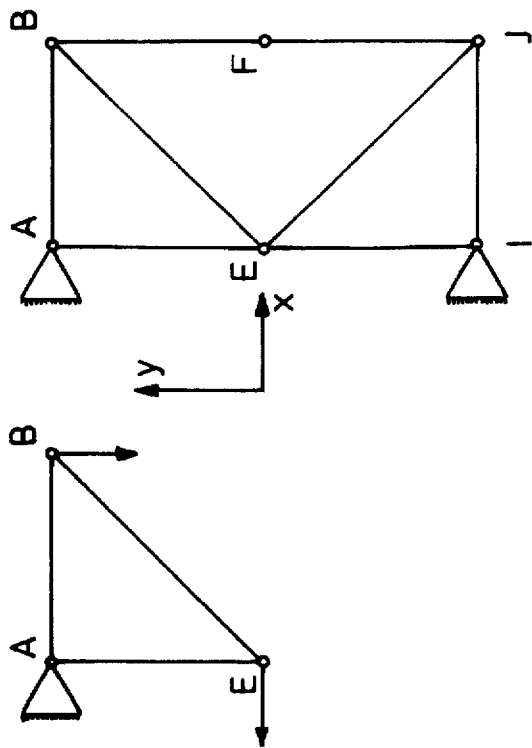

A system in which there is use of the longitudinal rigidity of the leaf springs used, and which also has the advantages of the system shown in FIGS 5a and 5b, is shown in FIGS. 6b and 6c. FIG. 6a illustrates the mode of operation of the systems shown in FIGS. 6b and 6c. FIG. 6a shows a triangular rod system, which rods are interconnected by means of ball joints at points A, B, E. The point A is connected to a fixed base. If the triangle is equilateral and the angle B-A-E is 90°, then a movement of the point B in the y-direction will result in the same amount of movement of the point E in the x-direction. If the lengths EA and BA are selected so that they are unequal, these movements are, of course, not equal to each other.

The system shown in FIG. 6b is based on the system of FIG. 6a, but is designed so that it is double, mirrored about the x-axis, and is provided with two additional rods BF and JF. At all corner points A, B, E, F, I, J the rods are interconnected again by ball joints, while in FIG. 6b the system is connected to a fixed base both at point A and at point I. In rest, the rods AE and IE lie in line with each other and the rods BF and JF also lie in line with each other, although this is not essential for the idea of the invention: in rest, the angles A-E-I and B-F-J can be smaller or greater than 180°, while they also need not be equal to each other. If point F is now moved from the rest position along the x-axis, points B and J move towards the x-axis, and point E shifts along the x-axis. Since both points A and I are fixed, the point E cannot make any lateral movement, and the elongation of the rods AE and IE must make this movement of the point E along the x-axis possible. In the system shown in FIG. 6b the longitudinal rigidity of the rods must therefore be used to minimize the lateral movement possibilities. The points B and J will carry out substantially the same movement, albeit mirrored about the x-axis. Owing to the longitudinal rigidity of the rods used, point F will be able to carry out virtually no lateral movement. It is possible to dimension the system in such a way that a very small deflection of E in the x-direction corresponds to a relatively much greater deflection of F along the x-axis. For example, a deflection of E over 0.1 mm from the rest position may correspond to a deflection of F over 3 mm from the rest position. If the triangles BAE and JIE are both equilateral and equal to each other, such a deflection also corresponds to a deflection of 0.1 mm of B and J in the y-direction.

With the system shown in FIG. 6b, a point mass applied in points F can thus make a substantially true linear movement in the x-direction, while the deflection in the lateral direction is less great than in the case of the system shown in FIGS. 5a and 5b. In order to give the system the same rigidity in a direction z perpendicular to the plane x-y in FIG. 6b, the plane AEFB can be placed at an angle of 120° to the plane EIJF and the same rod system EMNF as shown in FIG. 7, yet to be discussed, can be added thereto, while the plane EMNF also forms an angle of 120° with the two other planes AEFB and EIJF mentioned.

If a body with slightly greater dimensions has to undergo a linear movement, it is advantageous to mirror the system shown in FIG. 6b again about the y-axis, with the result that the additional system CDGHKL shown in FIG. 6c is obtained. The body 18 can then be fixed between the points FG. The rod system CDGHKL is preferably exactly the same as the rod system ABEFIJ, only mirrored about the y-axis, so that a further description thereof can be omitted.

Figure 7:
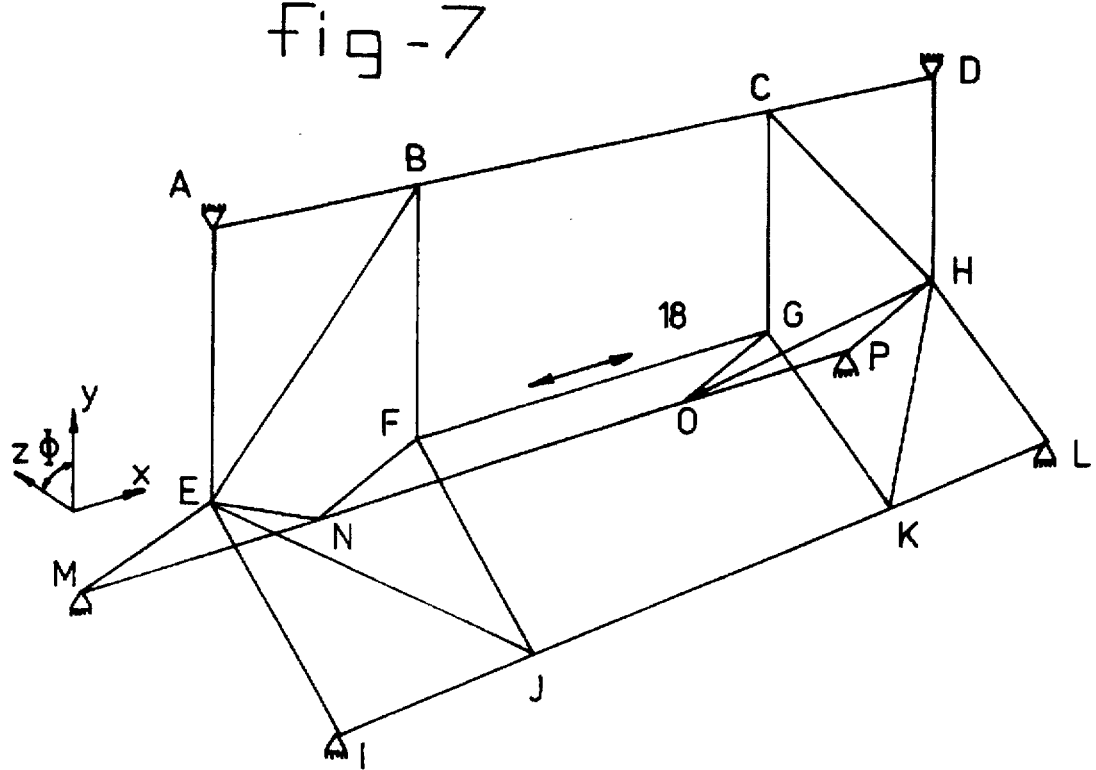
FIG. 7 shows a diagrammatic representation of a mechanical linear guide in three dimensions, based on the design principles of FIG. 6c.

In the same way as the system shown in FIG. 6b has a three-dimensional equivalent ABEFIJMN (see left side of FIG. 7), the system shown in FIG. 6c also has a three-dimensional equivalent which is shown in its entirety in FIG. 7. In FIG. 7 rods are also shown between the points B and C, J and K and N and O respectively. However, these three rods are not strictly necessary.

Figure 8:
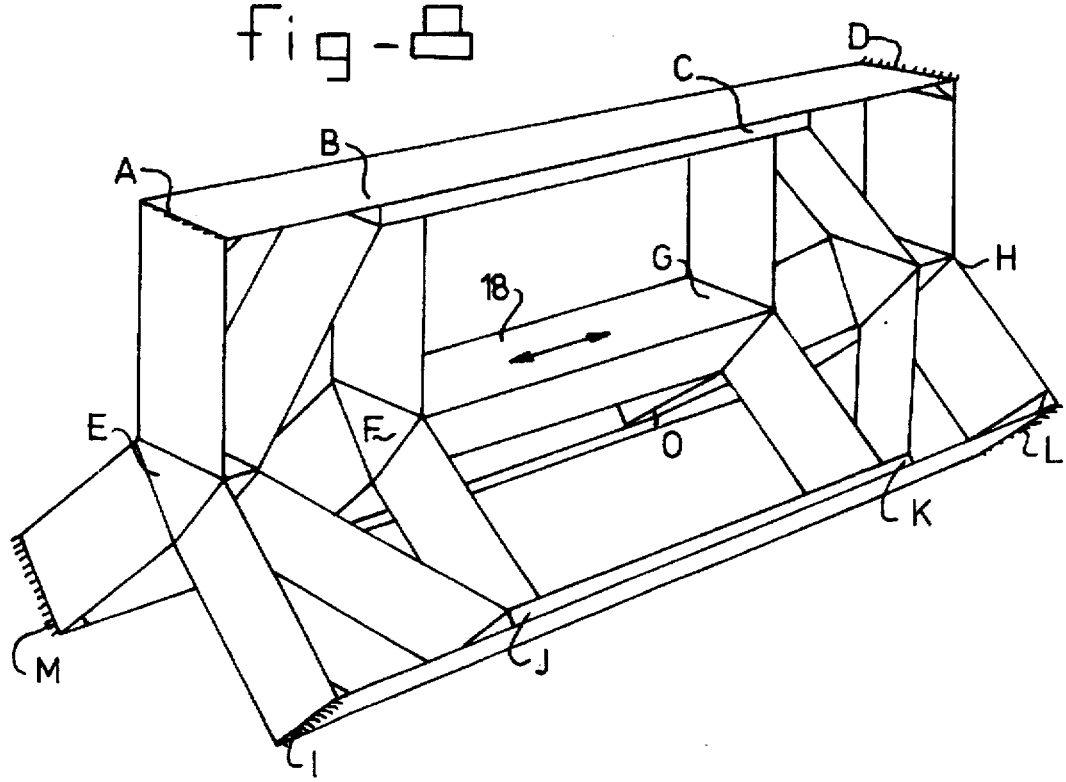
FIG. 8 shows a preferred embodiment of a mechanical linear guide based on FIG. 7.

The system shown in FIG. 7 gives the body 18 two degrees of freedom between the points F and G, namely translation in the direction of the x-axis and rotation in the φ direction. The degree of freedom in the x-direction is desirable, but that in the φ-direction must be eliminated. This can be achieved by means of the system shown in FIG. 8, in which all rods of the system shown in FIG. 7 are replaced by leaf springs. The leaf springs BC, JK and NO are not strictly necessary. The system shown in FIG. 8 does introduce an over-determination in the direction of both the y-axis and the z-axis, and also in the rotations, but this is negligible, because the over-determination forces occurring in those directions are connected with the in-plane bending rigidities of the leaf springs used, and these are, of course, already far exceeded by the longitudinal rigidity of the leaf springs. FIG. 8 shows a three-dimensional structure, but it will be clear to the person skilled in the art that it is also possible to design two two-dimensional structures (not shown) which are identical to those of FIGS. 6b and 6c, in which the rods concerned are replaced by leaf springs. With the embodiment shown in FIG. 8 it is possible to move the body 18 over a distance of 3 mm, while the points E and H are moved only over a distance of approximately 0.1 mm in the x-direction.

The rigidity of the system in the lateral direction must be as great as possible. This is related to the shape and the material of the leaf springs used. $TiAl_6V_4$ is selected as the preferred material, on account of the high fatigue stress, but other materials such a aluminium, spring steel and beryllium can also be used. The thicker the leaf springs, the greater the lateral rigidity of the system. However, this corresponds to a greater bending rigidity of the leaf springs, so that with increasing thickness the axial rigidity also increases. Increasing axial rigidity can be overcome, for example, by using an actuator with greater capacity, but that can be undesirable.

Figure 9:
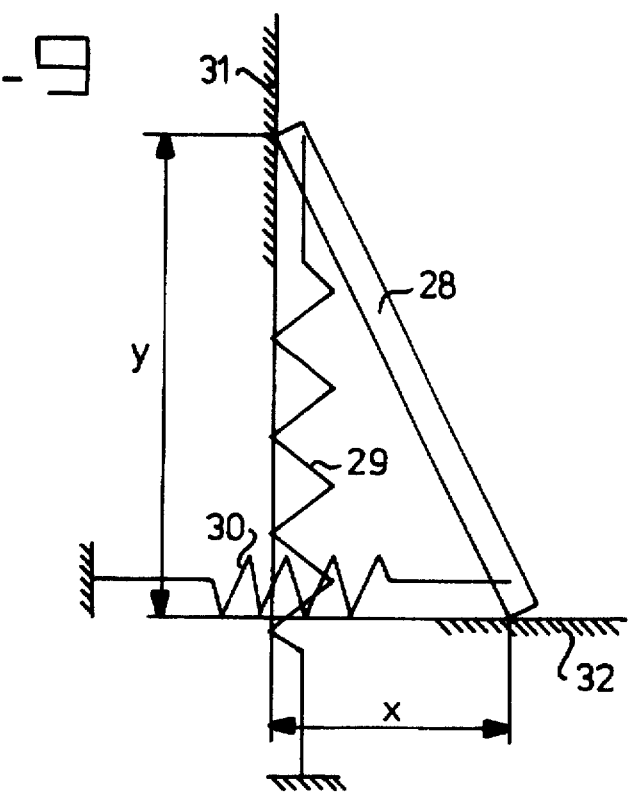
FIG. 9 shows an explanation of the principle of a constant energy system.

A way of making the lateral rigidity great enough while reducing the axial rigidity of the system was therefore sought. For this purpose, the starting point taken was the principle of constant energy, the basic principle of which is shown in FIG. 9. A rigid beam 28 rests without friction on a wall 32 and leans without friction against a wall 31. The point with which the beam 28 rests against the wall 31 is connected to a spring 29 with spring constant cy, which draws the beam 28 in the direction of the wall 32. The point with which the beam 28 rests on the wall 32 is connected to a spring 30 with spring constant cx, which draws the beam 28 in the direction of the wall 31. If the distance of the point with which the beam 28 rests on the wall 32 from the wall 31 is equal to x and the distance between the point with which the beam 28 leans against the wall 31 and the wall 32 is equal to y, then the following applies for the total spring energy U stored in the system (provided that the springs 29, 30 are in rest at deflections of y=0 and x=0 respectively):

$$U = \tfrac{1}{2}c_x x^2 = \tfrac{1}{2}c_y y^2 \tag{1}$$

If the spring constants cx and cy are selected so that they are equal to one another, then the following applies:

$$U = \tfrac{1}{2}c \cdot (x^2 + y^2) = \tfrac{1}{2}c \cdot l^2 = constant \tag{2}$$

in which l is the length of the beam 28.

It is therefore possible in theory to move the beam 28 with the supporting points along the wall 32 and the wall 31 without exerting any force thereon, of course if such a system were friction-free and loss-free. The principle of a force-free movement shown in FIG. 9 can be applied to the system shown in FIG. 8. The tensile forces corresponding to the leaf spring 29 shown in FIG. 9 are achieved with six springs, five 33 . . . 37 of which are visible in FIG. 10. The sixth spring 38 (not visible) runs parallel to spring 35 between the points K and O. The force indicated by the spring 30 in FIG. 9 corresponds in the system shown in FIG. 10 to the bending force of the leaf springs BF, JF, NF, CG, KG, OG. If the spring constant of the springs 33 to 38 is now selected at the correct value, the body can be moved axially by a very small axially directed force. In practice, for example, a system such as that shown in FIG. 10 is achieved, in which system a body of 1.35 kg was held in vibration at an amplitude of 3 mm with a force of max. 2.5 N.

Figure 10:
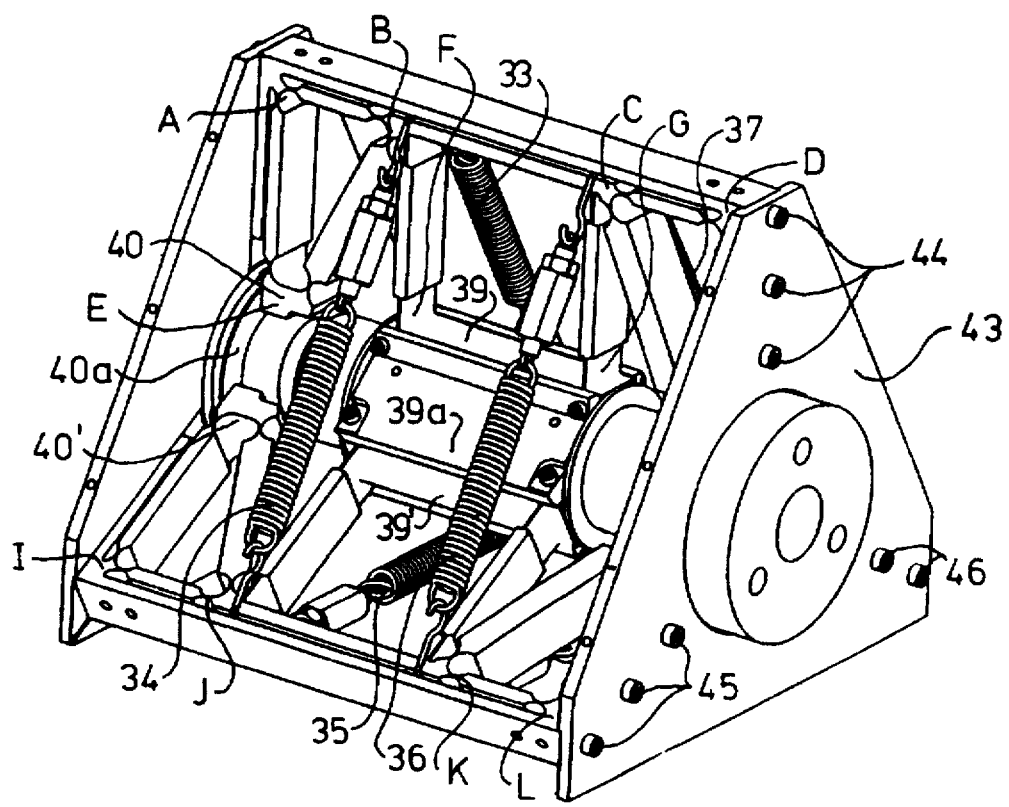
FIG. 10 shows a diagrammatic view of a realized mechanical linear guide.
Figure 11:
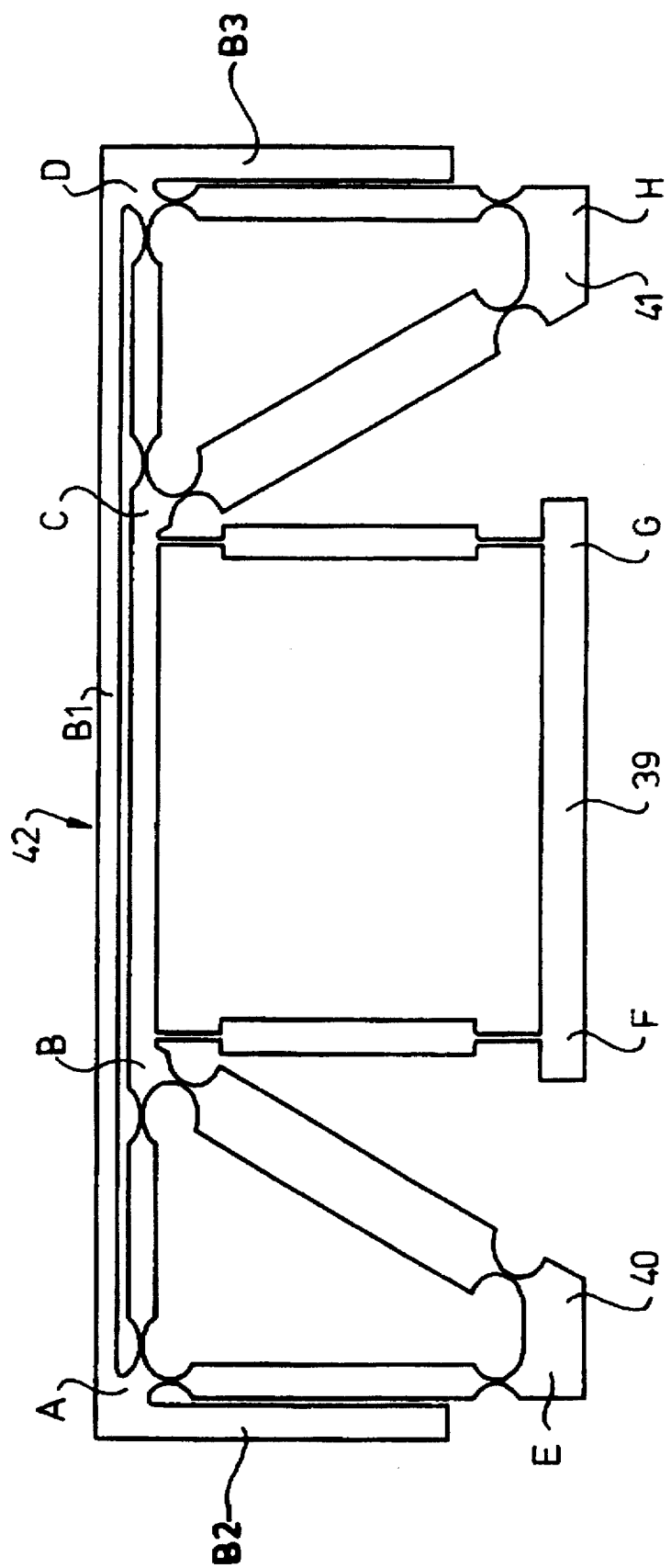
FIG. 11 shows one of the three monolithic parts which together form the mechanical linear guide shown in FIG. 10.

FIG. 11 shows a preferred design for a part 42 of the linear guide shown in FIG. 10. In the linear guide shown in FIG. 10, three of the parts 42 shown in FIG. 11 are interconnected. Each of the three identical parts 42 is connected by the two other parts to plate-shaped parts 39, 40, 41, preferably by way of connecting means 39a, 40a (see FIG. 10). FIG. 10 shows the situation in which the connecting means 40a is round. This round shape is not necessary, while more than one connecting means between the respective plate-shaped part 40 and the adjacent plate shaped part 40' can also be used. FIG. 10 also shows the adjacent plate-shaped parts 39 and 39' are interconnected by way of connecting means 39a, of which there are a total of three, but only one of which can be seen in the figure. The plate-shaped parts 41 of the three adjacent parts 42 are interconnected in the same way as the three plate-shaped parts 40.

Each of the three parts 42 is made in one piece, so that the whole linear guide is based on three monolithic identical parts which are interconnected and which are immovably fixed to a housing 43. For this purpose, each of the three monolithic designs shown in FIG. 11 has connecting beams B1, B2, B3 which are rigid and have substantially no bending action. The respective parts 42 are connected to the housing by means of, for example, bolts, a number of which are indicated by 44, 45, 46. With three of the parts shown in FIG. 11, a mechanical linear guide whose corner points A, D, I, L, M, P are connected to a fixed base, and whose other points can move within predetermined standards, is thus obtained. The use of monolithic parts 42 simplifies the assembly of the linear guide.

Finally, attention is also drawn to the special shape of the leaf springs, which all preferably have a thick, rigid central part and only at the ends are relatively thin. As a result, the leaf springs bend only at their ends, and a great bending resistance is also achieve. All leaf springs, apart from BF, CG, JF, KG, NF and OG preferably have a hole-type hinge construction. The leaf springs BF, CG, JF, KG, NF and OG preferably have relatively elongated, thin ends, for the benefit of the axial deflection possibilities of the body 18.

Table 2 gives and outline of the values achieved with a mechanical linear guide shown in FIG. 10, compared with the required values already shown in Table 1.

TABLE 2

| parameter | required value | achieved value |
| --- | --- | --- |
| amplitude vibrating body | 3 mm | 3 mm |
| frequency vibrating body | 4/12 Hz | 4/12 Hz |
| mass vibrating body | 0.76 kg | 1.35 kg |
| nominal movement (x-direction): | | |
| force noise amplitude at | | |
| −5/12 Hz | <19.2 nm | <10 nm |
| −6/12 Hz | <13.3 nm | <10 nm |
| −8/12 Hz | <15 nm | <10 nm |
| phase synchronization | $<1 \times 10^{-3}$ rad | $<1 \times 10^{-3}$ rad |
| parasitic movement (lateral) | | |

TABLE 2-continued

| parameter | required value | achieved value |
|---|---|---|
| force noise amplitude at | | |
| –5/12 Hz | <19.2 nm | <10 nm |
| –6/12 Hz | <13.3 nm | <10 nm |
| –8/12 Hz | — | 80 nm |
| course accuracy | <15 nm | 80 nm |

Table 2 shows that all design specifications have been met, except that the body is slightly heavier. It was also found that a lateral deflection of 80 nm occurred at the first harmonic frequency of 8/12 Hz, for which no required standard is specified. Despite that, the objectives set were amply achieved.

The point of departure for the design of a mechanical linear guide was the need for providing a linear guide for a body moving in space which can be used in a calibration unit for acceleration meters. Of course, use of the very accurate linear guide described here is not restricted thereto. The mechanical linear guide described can also be used, for example, in the case of precision guidance for optical components (for example, deceleration lines).

We claim:

1. In a mechanical linear guide for making a body (18) move along a movement axis (x), comprising n sets of a predetermined number of suspension means arranged between n sets of a predetermined number of points, defining n planes, n being either 2 or 3, said n planes having one coinciding axis of intersection defining said movement axis (x), said n planes meeting each other at an angle of 2π/n radians, each set of said n sets of points comprising one fixed first point (A, I; A, I, M), one movable second point (B, J; B, J, N) and one third point (F), said one third point (F) being situated on said coinciding axis of intersection (x) and being common to said each set of points, each set of said sets of suspension means comprising one first suspension means (AB, IJ; AB, IJ, MN) and one second suspension means (BF, JF; BF, JF, NF)

said first suspension means (AB, IJ; AB, IJ, MN) being connected at a first end to said fixed first point (A, I; A, I, M) and being movably connected at a second end to said second suspension means (BF, JF; BF, JF, NF) at a predetermined angle, at said movable second point (B, J; B, J, N), said second suspension means (BF, JF; BF, JF, NF) being movably connected to said body (18) at said third point (F);

the improvement wherein each said set of points comprises one fourth point (E) situated on said coinciding axis of intersection (x) and being common to each said set of points, and said each set of suspension means further comprises one third suspension means (AE, IE; AE, IE, ME) and one fourth suspension means (EB, EJ; EB, EJ, EN), within said each set of suspension means, said third suspension means (AE, IE; AE, IE, ME) being connected at a first end to said first fixed point (A, I; A, I, M) and movably connected at a second end to a first end of said fourth suspension means (EB, EJ; EB, EJ, EN) at said fourth point (E), said fourth suspension means (EB, EJ; EB, EJ, EN) being movably connected at a second end to both said first (AB, IJ; AB, IJ, MN) and said second (BF, JF; BF, JF, NF) suspension means at said second point (B), each of said third suspension means (AE, IE; AE, IE, ME) of said each set of suspension means and each of said fourth suspension means (EB, EJ; EB, EJ, EN) of said each set of suspension means being movably interconnected at said common fourth point (E), and within said each set of suspension means said first suspension means (AB, IJ; AB, IJ, MN), said third suspension means (AE, IJ; AE, IE, ME) and said fourth suspension means (EB, EJ; EB, EJ, EN) being arranged in a triangle.

2. Mechanical linear guide according to claim 1, wherein further said sets of points each comprise one fixed fifth point (D, L; D, L, P), one movable sixth point (C, K; C, K, O), one seventh point (G) and one eighth point (H), said seventh point (G) being situated on said coinciding axis of intersection (x) and being common to all said further sets of points, said eighth point (H) being situated on said coinciding axis of intersection (x) and being common to all said further sets of points, the body (18) being connected between said third point (F) and said seventh point (G), and said fixed fifth point (D, L; D, L, P), said movable sixth point (C, K; C, K, O), said seventh point (G) and said eighth point (H) of each said further set of points forming a quadrangle which is substantially the mirror image of a quadrangle formed by said fixed first point (A, I; A, I, M), said movable second point (B, J; B, J, N), said third point (F) and said fourth point (E), respectively, of the first-mentioned said sets of points, relative to a plane perpendicular to said coinciding axis of intersection (x) when the body is at rest, sets of suspension means for said further sets of points each comprising one fifth suspension means (DC, LK; DC, LK, PO) arranged between said fixed fifth point (D, L; D, L, P) and said movable sixth point (C, K; C, K, O), one sixth suspension means (CG, KG; CG, KG, OG) arranged between said movable sixth point (C, K; C, K, O) and said seventh point (G), one seventh suspension means (DH, LH; DH, LH, PH) arranged between said fixed fifth point (D, L; D, L, P) and said eighth point (H), and one eighth suspension means (CH, KH; CH, KH, OH) arranged between said movable sixth point (C, K; C, K, O) and said eighth point (H).

3. Mechanical linear guide according to claim 1, wherein each of said sets of suspension means comprises one ninth suspension means (BC, JK; BC, JK, NO) between the movable second point (B, J; B, J, N) and the movable sixth points (C, K; C, K, O).

4. Mechanical linear guide according to claim 1, wherein each of the suspension means are formed either from leaf springs or hole-type hinges.

5. Mechanical linear guide according to claim 4, wherein the leaf springs or hole-type hinges are made of TiAl$_6$V$_4$.

6. Mechanical linear guide according to claim 1, wherein n=3, and said movable second points (B, J, N) are interconnected by a first set of springs (33, 34, 35) and the movable sixth points (C, K, O) of the further sets of points are interconnected by a second set of springs (36, 37, 38) in order to exert a laterally directed force such that axial rigidity of the guide is reduced.

7. Mechanical linear guide according to claim 1, wherein n=3 and the mechanical linear guide is constructed of three substantially identical monolithic parts (42).

8. A calibration unit (8) for a gravitational field measuring device, based on acceleration recorders, which calibration unit (8) comprises three substantially identical calibration devices (9, 10, 11) and three bodies (18), each body (18) being associated with one calibration device and having a mechanical linear guide as claimed in claim 1, said bodies vibrating along different axes of an orthogonal coordinate system (x, y, z) and thus determining a coordinate system of the acceleration recorders.

* * * * *